United States Patent
Koltzoff et al.

(10) Patent No.: US 6,961,861 B2
(45) Date of Patent: Nov. 1, 2005

(54) GLOBALLY CLOCKED INTERFACES HAVING REDUCED DATA PATH LENGTH

(75) Inventors: Alex N. Koltzoff, Corte Madera, CA (US); David C. Kehlet, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 680 days.

(21) Appl. No.: 10/085,184

(22) Filed: Feb. 27, 2002

(65) Prior Publication Data

US 2003/0160797 A1 Aug. 28, 2003

(51) Int. Cl.[7] .............................................. G06F 1/12
(52) U.S. Cl. ..................... 713/400; 713/500; 713/503; 713/600; 711/155; 711/163; 714/744; 714/763; 714/775; 714/789; 375/354; 375/355; 375/364; 375/371; 375/375; 712/225; 715/500.1; 386/48; 386/119
(58) Field of Search ............................... 713/400, 401, 713/500, 503, 600; 711/155, 163; 714/744, 763, 775, 789; 375/354, 355, 364, 371, 375; 712/225; 715/500.1; 386/48, 119

(56) References Cited

U.S. PATENT DOCUMENTS

| 5,392,422 | A | * | 2/1995 | Hoel et al. ................... 710/113 |
| 5,911,056 | A | * | 6/1999 | Faget et al. .................. 710/305 |
| 5,926,837 | A | * | 7/1999 | Watanabe et al. ............ 711/167 |
| 6,061,073 | A | * | 5/2000 | Larson ......................... 345/501 |
| 6,128,748 | A | * | 10/2000 | MacWilliams et al. ...... 713/401 |
| 2002/0010872 | A1 | * | 1/2002 | Van Doren et al. .......... 713/400 |
| 2002/0129215 | A1 | * | 9/2002 | Yoo et al. ..................... 711/167 |
| 2002/0161968 | A1 | * | 10/2002 | Yoo et al. ..................... 711/105 |
| 2003/0105985 | A1 | * | 6/2003 | Keller et al. ................. 713/400 |

* cited by examiner

Primary Examiner—Lynne H. Browne
Assistant Examiner—Nitin C. Patel
(74) Attorney, Agent, or Firm—Osha Liang LLP (57) ABSTRACT

A interface, which connects memory and an integrated circuit, having a write path and read path that allow synchronous data propagation is provided. Further, a method for synchronizing data propagation through a read path and a write path of an interface is provided. The interface uses clock signals and paths based on a clock signal to synchronize the flow of data through various paths within the interface.

17 Claims, 8 Drawing Sheets

GLOBALLY CLOCKED INTERFACES HAVING REDUCED DATA PATH LENGTH

BACKGROUND OF INVENTION

A typical modern computer system includes a microprocessor, memory, and peripheral computer resources, i.e., monitor, keyboard, software programs, etc. The microprocessor has, among other components, arithmetic, logic, and control circuitry that interpret and execute instructions from a computer program.

Figure 1:
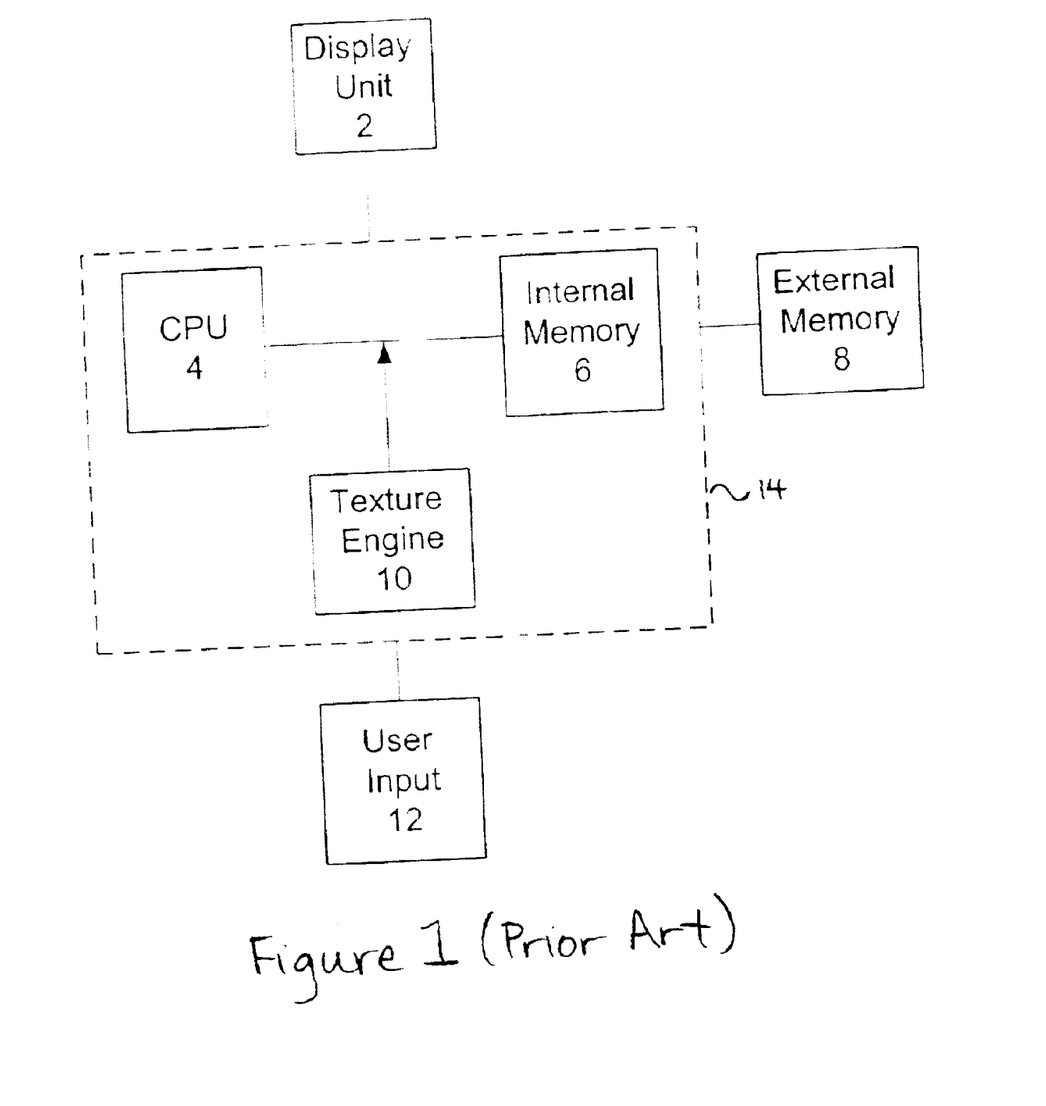
FIG. 1 shows a schematic diagram of a prior art computer system.

FIG. 1 shows a prior art diagram of an example of a computer system that has a display unit (2), user input (12), external memory (8), internal memory (6), a central processing unit (CPU) (4), and a texture engine (10). The display unit (2), user input (12), and external memory (8) are external components, while the CPU (4), texture engine (10), and internal memory (6) are internal components (14). The CPU (4) and texture engine (10) are also parts of the arithmetic, logic, and control circuitry of the microprocessor.

One goal of the computer system is to execute instructions provided by the computer's users and software programs. The execution of instructions is carried out by the CPU (4). Data needed by the CPU (4) to carry out an instruction is fetched from the external memory (8) and copied into the internal memory (6). The CPU (4) normally uses the data copies to carry out an instruction rather than the original data because, in many cases, the microprocessor can access the internal memory (6) more quickly than the external memory (8).

Figure 2:
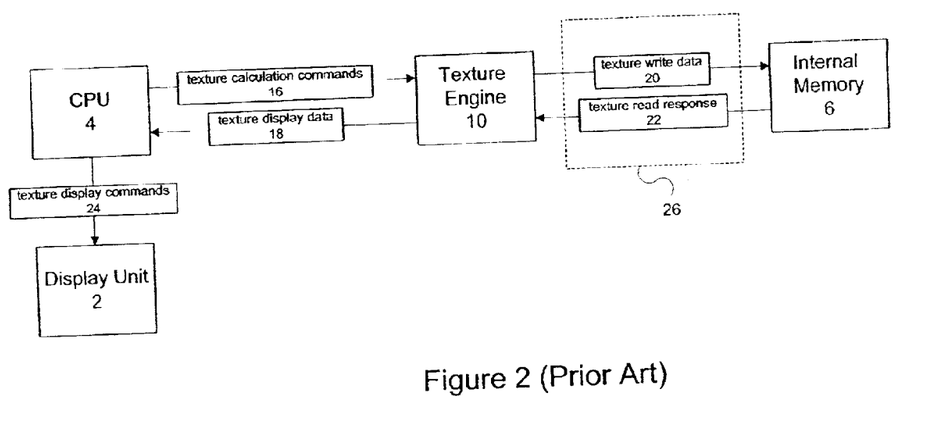
FIG. 2 shows a schematic diagram of data flow in a prior art computer system.

The texture engine (10) interpolates and maps data that allows the display unit (2) to display graphical images with textured surfaces. FIG. 2 shows how texture instructions and texture data flow through the computer system when a texture is constructed for a graphical image. When the CPU (4) receives input telling it to construct a particular graphical image, the CPU (4) sends texture calculation commands (16) to the texture engine (10). The texture engine uses the texture calculation commands (16) to determine what texture write data (20) to send to the internal memory (6). The texture write data (20) tells the internal memory what texture gradients, colors, etc. to send back to the texture engine (10) in the texture read response (22). Next, the texture engine (10) interpolates, or maps, the texture read response (22) into texture display data (18). The texture display data (18) is used by the CPU (4) to construct texture display commands (24). The texture display commands (24) tell the display unit (2) how to display the graphical image.

The texture engine (10) interacts with the internal memory (6) through an input/output port called an interface (26). Because the texture engine (10) performs several calculations to produce each image, the rate at which it sends and receives data through the interface (26) is critical in determining the amount of time it will take to display a graphical image. As a result, the rate at which the interface (26) between the texture engine (10) and the internal memory (6) propagates data is a primary concern. The rate at which the texture engine propagates data is also known as the speed of the interface (26). The speed of the interface (26) is determined by the interface's (26) type and construction.

Figure 3:
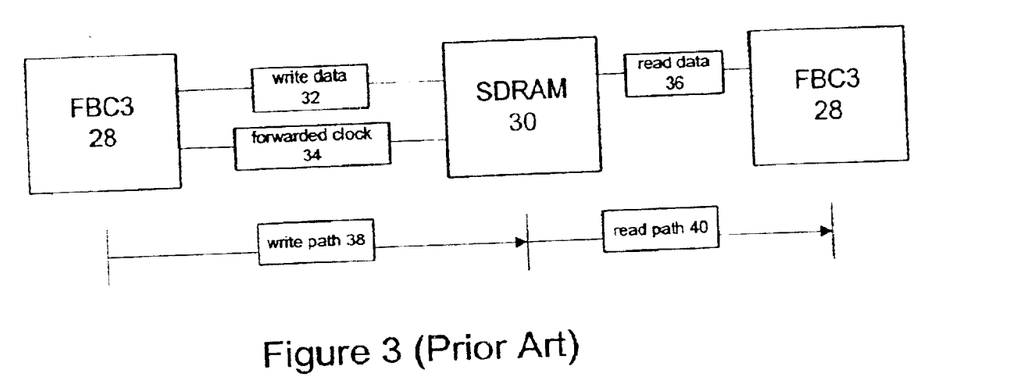
FIG. 3 shows a phase diagram of data flow through the interface.

A prior art interface is illustrated in FIG. 3. This type of interface is called a clock forwarding interface. In order for a clock forwarding interface to operate correctly, each device that accepts input from the interface (26), also called a client device, must emit a forwarded clock. Referring to FIG. 3, a FBC3 (28) is an application-specific integrated circuit (ASIC) that features a texture engine (10), while an SDRAM (30) is a component of the internal memory (6). The FBC3 (28) propagates write data (32) and a forwarded clock (34) to the SDRAM (30) along a write path (38). The forwarded clock (34) is in sync with the FBC3's core clock. Next, the SDRAM (30) propagates read data (36) to the FBC3 (28) along a read path (40).

Because the SDRAM (30) is a globally synchronous device, it cannot emit its own forwarded clock. However, because a clock forwarding interface requires that each client device emit a forwarded clock, the SDRAM (30) emits an imaginary clock, also known as a virtual clock. The time phase of the virtual clock is perceived through the phase of the read data (36).

SUMMARY OF INVENTION

According to one aspect of the present invention, an interface between memory and an integrated circuit comprises a write path comprising a write data path and a forwarded clock path and a read path comprising a read data path, where data propagated through the write path and read path is synchronized by a clock signal.

According to another aspect, a computer system having an interface dependent on a clock signal and having a write path and a read path comprises a memory and an integrated circuit, where the interface operatively connects the memory and integrated circuit, synchronizes write data propagating through the write path with a first clock signal propagating through the write data path, and synchronizes read data propagating through the read path with a second clock signal.

According to another aspect, a method for synchronizing data propagation through an interface connecting memory and an integrated circuit, where the interface having a write path and a read path, comprises propagating data through a write data path, propagating a clock signal through a forwarded clock path, synchronizing the data propagation through the write data path to the forwarded clock path, propagating data through a read data path, and synchronizing the data propagation through the read data path to the clock signal.

Other aspects and advantages of the invention will be apparent from the following description and the appended claims.

DETAILED DESCRIPTION

Embodiments of the present invention will be described with reference to the accompanying drawings. Like items in the drawings are shown with the same reference numbers.

The invention relates to a method and apparatus that reduces the data path length of a prior art interface such as that shown in FIG. 3. An advantage of reducing the data path length is that it often increases the maximum operating speed (MOS) of the interface (26). The data path length is reduced by optimizing the construction of the write and read paths (38 and 40). For example, the path construction can be optimized by decreasing the clock cycle of the interface (decreasing the amount of time between clock pulses) or by decreasing the physical length of the paths (38 and 40).

Figure 4A:
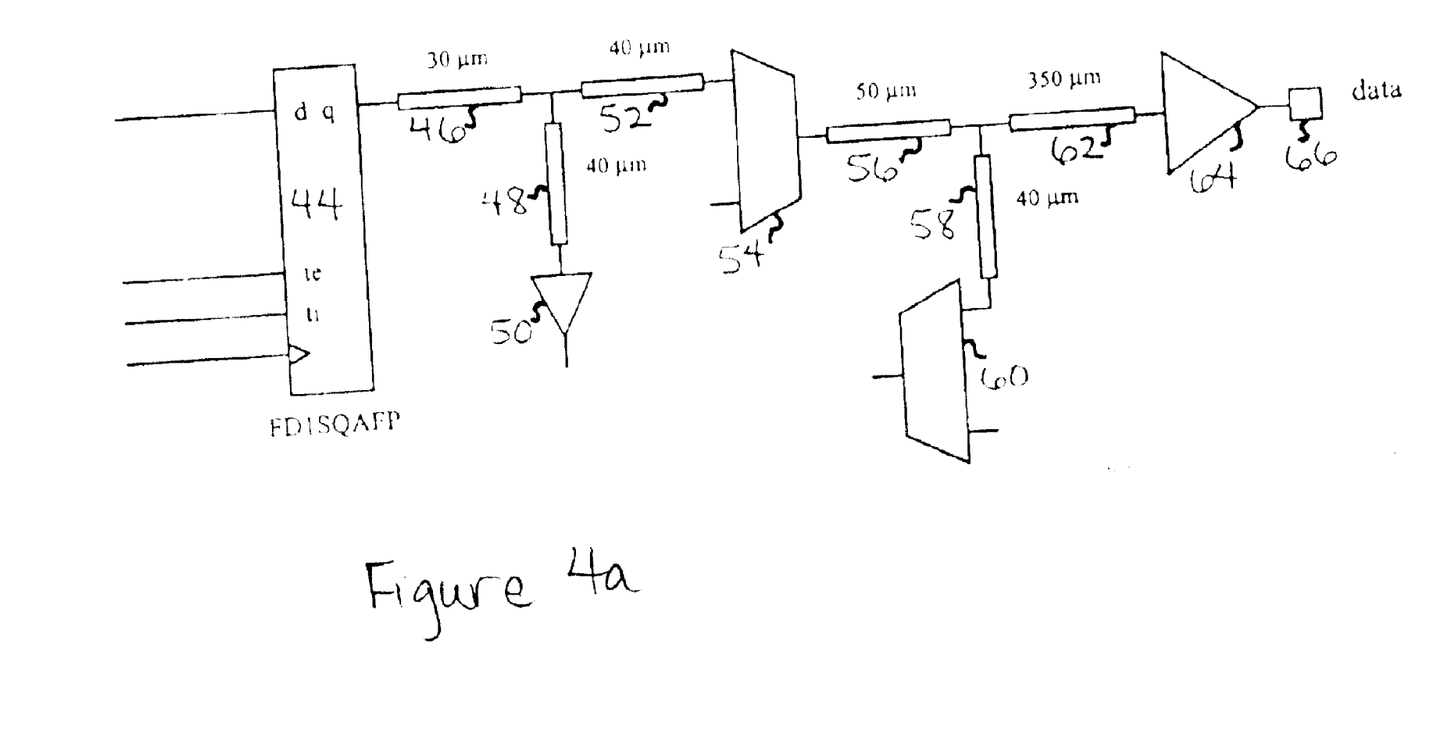
FIG. 4a shows a device layout of the write path and the read path in accordance with one embodiment of the invention.

FIG. 4a is a schematic layout of an embodiment of the write data path (the collection of devices the write data (32) is propagated through). In this figure, a flip-flop (44) circuit is shown with inputs d, te, and ti, and a clock, and output q. Output q is attached to a transmission line (46), which outputs a value to transmission lines (48) and (52). Transmission line (48) outputs a value to a buffer (50), and transmission line (52) outputs a value to a mux (54). Mux (54) is attached to a transmission line (56), which outputs a value to transmission lines (58) and (62). Transmission line (58) is attached to a mux (60) and transmission line (62) is attached to an buffer (64). Buffer (66) outputs a data value (66).

Figure 4B:
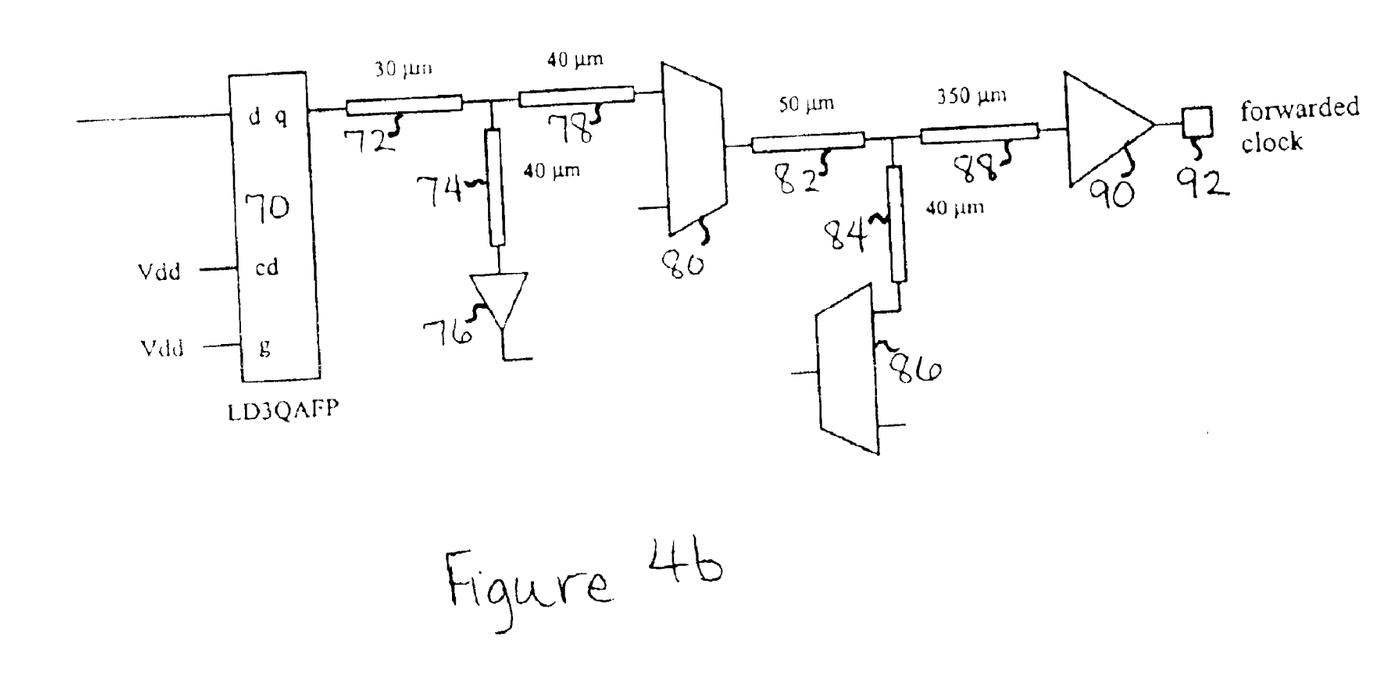
FIG. 4b shows a device layout of the write path and the read path in accordance with another embodiment of the invention.

FIG. 4b is a schematic layout of an embodiment of the forwarded clock path (the collection of devices the forwarded clock (34) is propagated through). Instead of outputting a data value (66), the forwarded clock path outputs a forwarded clock value (92). Elements (46), (48), (50), (52), (54), (56), (58), (60), (62), and (64) have all been replicated from the write data path into the forwarded clock path as elements (72), (74), (76), (78), (80), (82), (84), (86), (88), and (90) respectively. The data path's flip-flop (44), however, cannot be replicated, and is approximated with another type of flip-flop called a transparent latch (70).

By replicating as many devices from the write data path as possible, the invention equalizes the propagation times of the write data (32) and the forwarded clock (34) within a small margin of error. By approximating the flip-flop (44) with the transparent latch (70), the invention decreases that margin of error because the time delay the flip-flop (44) adds to the write data path (42) is approximated by the time delay of the transparent latch (70). An advantage of equalizing the propagation time in both paths is that the clock cycle for each path decreases.

Figure 5:
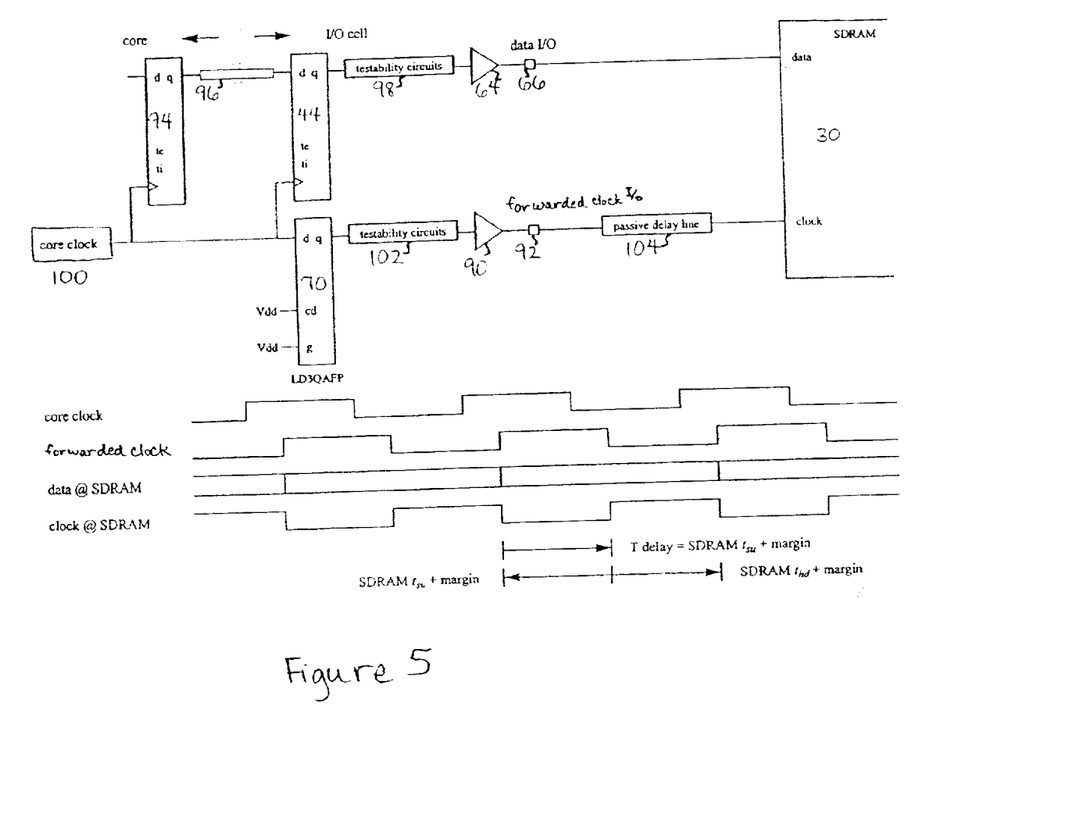
FIG. 5 shows the SDRAM write timing scheme in accordance with one embodiment of the invention.

FIG. 5 illustrates how the write data path (42) and the forwarded clock path (68) connect the FBC3 (28) and the SDRAM (30). Excluding devices (64) and (90) and outputs (64) and (92), the components of the write data path and the forwarded clock path have been lumped into testability circuits (98) and (102) respectively. A transmission line (96) has been attached to flip-flop (44). Flip-flop (94) supplies the input to transmission line (96) and a core clock (100) clocks the clock cycle of flip-flop (94). Devices (94), (96), and (100) are all parts of the FBC3 (28).

As shown in FIG. 5, a passive delay line (104) has been added to the forwarded clock path between the forwarded clock value (92) and the SDRAM (30). The passive delay line (104) (whose length may be determined by a spreadsheet that accounts for clock skew and other uncertainties that may occur) allows the invention to establish a precise time phase relationship between the write data (32) and the forwarded clock (34). A precise time phase relationship must be established in order for the write path (38) to meet the SDRAM's (30) setup and hold time requirements. The setup and hold times define the time periods during which the SDRAM's inputs must be kept stable.

As shown at the bottom of FIG. 5, the time delay for the setup and hold time parameters determines the clock cycle of the SDRAM (30), which, in turn, affects the time phase of the forwarded clock path. Referring to the lower portion of FIG. 5, the start and end points for each data block that is transmitted are now aligned with the start and end points of each clock cycle of the forwarded clock (34). An advantage of establishing a precise time phase relationship is that the clock cycle for the write path (38) decreases even further.

Figure 6:
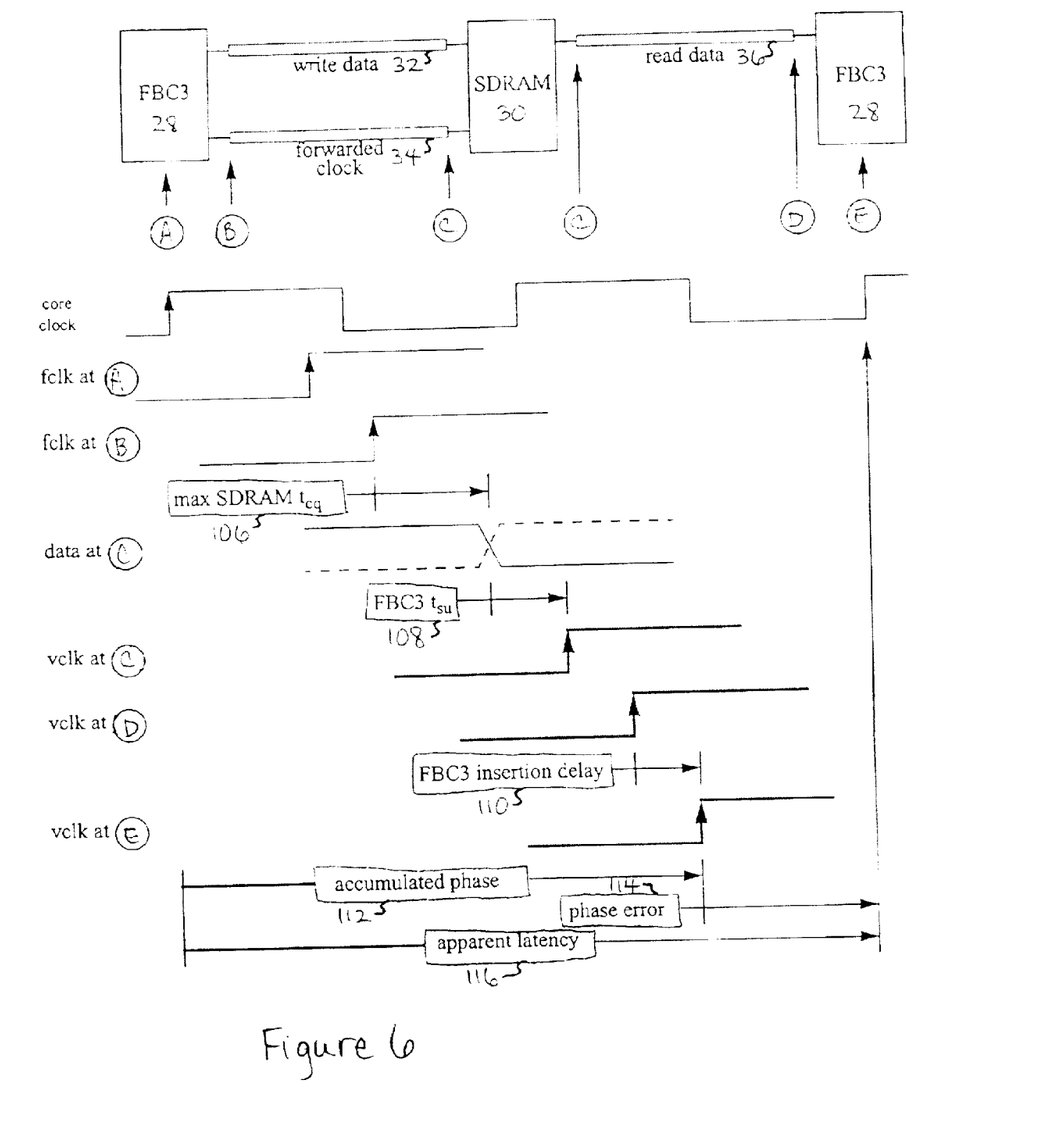
FIG. 6 shows phase relationships in a complete clock forwarding scheme in accordance with one embodiment of the invention.

FIG. 6 gives the timing relationships of the forwarded clock (34), the data being transmitted through the interface (26), and the virtual clock (perceived through the phase of the read data (36)) relative to the FBC3's (28) core clock (100). Timing relationships are shown at points A, B, C, D, and E. HSPICE (a circuit simulator well known to those of the art) was used to approximate timing delay parameters max SDRAM $t_{cq}$ (106), FBC3 $t_{su}$ (108) (setup time), FBC3 insertion delay (110) (clock delay), accumulated phase (112), phase error (114), and apparent latency (116) for the forwarded clock (34) and the virtual clock.

By absorbing the accumulated phase (112) of the virtual clock relative to the core clock (100), it is possible establish a precise time phase relationship between the virtual clock and the core clock (100). Again, an advantage of establishing a precise time phase relationship is that the clock cycle for the read path (40) decreases.

One method of absorbing the accumulated phase (112) is to insert a series of flip-flops, known as a pipeline, into the read path (40). An implementation of this method is given in FIG. 7. A pipeline (132) of four flip-flops (122, 124, 126, and 128) has been inserted into the read path (40) after buffer (118) and testability circuits (130) and before logic (120). Each flip-flop absorbs a portion of the accumulated phase so that, when the virtual clock reaches the FBC3 (28), it is in phase with the core clock (100). The number of flip-flops needed for the pipeline was calculated as follows:

Number of flip-flops needed =

Figure 7:
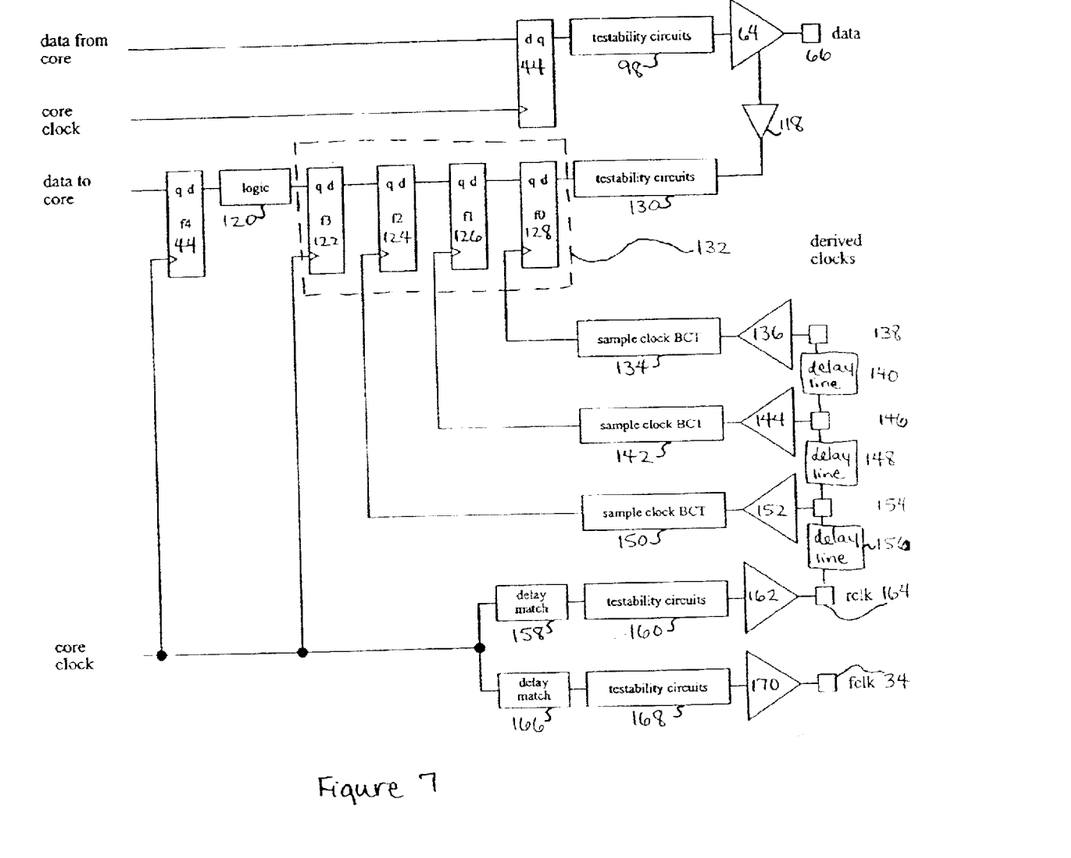
FIG. 7 shows a read path synchronized with a 4-stage pipeline in accordance with one embodiment of the invention.

(Accumulated Phase / Absorption per Stage) + 1 =

(10753 pS / 1347 pS) + 1 = 3.46 = approximately 4

Because the accumulated phase and absorption per stage are dependent on each embodiment of the invention, alternative embodiments of the invention may or may not use the same number flip-flops in the pipeline (132).

Referring to FIG. 7, flip-flop 122 is clocked by the core clock (100), however, flip-flops (124), (126), and (128) are clocked by derived clocks (154), (156), and (138) respectively. The derived clocks are created by using printed circuit board (PCB), resident, analogue, precision delay lines (156), (148), and (140). The derived clocks (154, 156, and 158) are connected in series with the delay lines (156, 148, and 140) in the manner shown in FIG. 7.

The lengths of the delay lines (154, 156, and 158) were determined by the amount of time of used for each derived clock cycle. This amount of time was calculated as follows:

Length of each derived clock cycle =

Accumulated phase/(Number of pipeline stages − 1) =

$$10753 \text{ pS}/(4-1) = 3584.3 \text{ pS}$$

In other words, the clock cycle of each derived clock is 3584.3 picoseconds long, whereas the clock cycle of the core clock is 5714.3 picoseconds long. As a result, the interval between the derived clocks (154, 156, and 158) is less than the core clock (100) period. An advantage of this is that read data (40) propagates through the interface (26) faster, which increases the MOS of the interface (26).

Referring again to FIG. 7, the path of each derived clock (154, 156, and 158) also includes a buffer (152, 144, and 136 respectively) and a sample clock BCT (150, 142, and 134) between the clock and the flip-flop to which it is connected. The delay line (156) used to create the third derived clock (154) is connected in series to a reference clock (164). The reference clock (164) is in sync with the forwarded clock (34) because a delay match (166) and testability circuits (168) used to create the forwarded clock (34) have been replicated as devices (158) and (160) for the reference clock (164). Both the reference clock (164) and the forwarded clock (34) are derived from the core clock (100).

The various embodiments to the invention provide one or more of the following advantages. A method of optimizing the read and write paths of a clock forwarding interface that can be used with a globally synchronous client device has been provided. Thus, the maximum operating speed of the clock forwarding interface may be increased. Thus, the interface may be used with devices that have higher clock frequencies.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An interface between memory and an integrated circuit, comprising:

a write path comprising a write data path and a forwarded clock path, wherein data propagated through the write path is synchronized by a clock signal;

a read path comprising a read data path;

circuitry configured to measure accumulated phase of data on the read data path relative to the clock signal and further configure to compensate for the accumulated phase, wherein data propagated through the read path is synchronized by the clock signal based on the circuitry.

2. The interface of claim 1, wherein the write data path synchronizes operations with the forwarded clock path, and wherein the forwarded clock path uses the clock signal as a time reference.

3. The interface of claim 1, wherein the clock signal is provided by the integrated circuit.

4. The interface of claim 1, wherein the read path and write path operatively connect the memory and the integrated circuit.

5. The interface of claim 1, wherein the memory is SDRAM.

6. The interface of claim 1, wherein the integrated circuit comprises a texture engine.

7. The interface of claim 1, wherein the write data path comprises circuitry having a first data propagation time, wherein the forwarded clock path comprises circuitry having a second data propagation time, and wherein the first data propagation time is substantially equal to the second data propagation time.

8. The interface of claim 1, wherein the circuitry is pipeline circuitry adapted to compensate for accumulated phase generated by data propagation through the read data path.

9. The interface of claim 8, wherein the pipeline circuitry inputs at least one clock signal, and wherein the at least one clock signal is dependent on the clock signal.

10. A computer system having an interface dependent on a clock signal and having a write path and a read path comprising:

a memory; and an integrated circuit, wherein the interface operatively connects the memory and integrated circuit, synchronizes write data propagating through the write path with a first clock signal propagating through the write data path, and synchronizes read data propagating through the read path with a second clock signal by measuring accumulated phase of the read data relative to the second clock signal and compensating for the accumulated phase.

11. The computer system of claim 10, wherein the first clock signal is derived from the second clock signal.

12. A method for synchronizing data propagation through an interface connecting memory and an integrated circuit, the interface having a write path and a read path, comprising:

propagating data through a write data path, wherein the write path comprises the write data path and a forwarded clock path;

propagating a clock signal through the forwarded clock path;

synchronizing the data propagation through the write data path to the forwarded clock path;

propagating read data through a read data path, wherein the read path comprises the read data path; and synchronizing the read data propagation through the read data path to the clock signal by measuring accumulated phase of the read data relative to the clock signal and compensating for the accumulated phase.

13. The method of claim 12, wherein the clock signal is received from the integrated circuit.

14. The method of claim 12, wherein the memory is SDRAM.

15. The method of claim 12, wherein the integrated circuit comprises a texture engine.

16. The method of claim 12, wherein the read path and write path operatively connect the memory and the integrated circuit.

17. The method of claim 12, wherein a first amount of delay is needed to propagate a first amount of data through the write data path, wherein a second amount of delay is needed to propagate a second amount of data through the forwarded clock path, and wherein the first amount of delay is substantially equal to the second amount of delay.

* * * * *